United States Patent [19]
Friis

[11] Patent Number: 5,769,513
[45] Date of Patent: Jun. 23, 1998

[54] BLANK FOR MODULAR ARTICLE STORAGE RACK SYSTEM

[76] Inventor: Ruben Friis, Bennechesgt, 3, N-0169 Oslo, Norway

[21] Appl. No.: 836,096

[22] PCT Filed: Oct. 16, 1995

[86] PCT No.: PCT/NO95/00188

§ 371 Date: Apr. 17, 1997

§ 102(e) Date: Apr. 17, 1997

[87] PCT Pub. No.: WO96/11606

PCT Pub. Date: Apr. 25, 1996

[30] Foreign Application Priority Data

Oct. 18, 1994 [NO] Norway ................................. 943947

[51] Int. Cl.$^6$ ............................. B65D 85/57; A47B 43/00
[52] U.S. Cl. ........................ 312/108; 312/228; 312/9.57; 312/9.9
[58] Field of Search ................................ 312/9.57, 9.47, 312/9.1, 9.9, 9.11, 258, 205, 108

[56] References Cited

U.S. PATENT DOCUMENTS

| | | | |
|---|---|---|---|
| 1,259,602 | 3/1918 | Clark | 312/9.47 |
| 1,384,880 | 7/1921 | Asher | 312/108 |
| 3,904,259 | 9/1975 | Hoffmann et al. | |
| 4,235,490 | 11/1980 | Schwartz et al. | 312/9.57 |
| 4,239,109 | 12/1980 | Nielsen et al. | 312/9.57 X |
| 4,275,943 | 6/1981 | Gelardi et al. | 312/9.57 |
| 4,662,515 | 5/1987 | Newby, Sr. | 312/258 X |
| 4,771,887 | 9/1988 | Nehl | 312/9.57 X |
| 4,819,802 | 4/1989 | Gutierrez | 312/9.57 X |
| 4,887,874 | 12/1989 | Joffe | 312/258 |
| 5,143,431 | 9/1992 | Udell | 312/258 X |
| 5,154,291 | 10/1992 | Sur | 312/9.11 X |
| 5,334,904 | 8/1994 | Kramer. | |
| 5,636,752 | 6/1997 | Gallagher | 312/9.9 X |
| 5,651,456 | 7/1997 | Gunning | 312/9.47 X |

FOREIGN PATENT DOCUMENTS

| | | | |
|---|---|---|---|
| 268353 | 12/1964 | Australia | 312/108 |
| 95100 | 4/1963 | Denmark | 312/9.9 |
| 2753356 | 5/1979 | Germany | 312/9.1 |
| 32 02 204 | 8/1983 | Germany. | |
| 459 146 | 6/1989 | Sweden. | |
| 0793415 | 4/1958 | United Kingdom | 312/9.9 |
| 2 277 318 | 10/1994 | United Kingdom. | |
| 95/14995 | 6/1995 | WIPO. | |

*Primary Examiner*—Peter M. Cuomo
*Assistant Examiner*—David E. Allred
*Attorney, Agent, or Firm*—IP Group of Pillsbury Madison & Sutro LLP

[57] ABSTRACT

For providing a rack for storing compact disks or drawers for storing articles, a selected number of blanks, a top plate and a base are provided. Each rack unit blank has a central plate, and three side plates which are folded down to provided respective tabs having horizontally inwardly projecting pegs which are received in horizontally outwardly opening holes formed in corresponding locations on the next underlying module. The top plate has similar holes. The rack assembled provides one horizontally forwardly opening storage slot per rack unit. Springs and spaces may be molded with or assembled to the rack unit blanks for interaction with the stored articles.

5 Claims, 3 Drawing Sheets

BLANK FOR MODULAR ARTICLE STORAGE RACK SYSTEM

This application is the national phase of international application PCT/ NO95/00188 filed Oct. 16, 1995 which designated the U.S.

BACKGROUND OF THE INVENTION

The present invention relates to a modular rack system for storing article such as compact discs, and drawers containing smaller objects Today compact discs are usually kept in racks which are produced as a unit for a certain number of compact discs. These storage units are found in the form of cases or trays for a certain number of discs which can be placed on a rack, or as columns where there are insertion compartments for compact discs in large numbers. These known rack systems are not very flexible, as the available space for compact discs and the number of compact discs which it is desired to store are often not commensurate with one another, such that if an existing compact disc storage system is full, the user has to buy a new, larger unit just to store one more compact disc.

Moreover, these stands take up a lot of storage space at the dealer's and are expensive to transport from the manufacturer to the dealer because most of these previously known compact disc stands are assembled while in the hands of the producer.

SUMMARY OF THE INVENTION

One of the objects of the present invention is to provide a compact disc stand which costs little to transport from the producer to the dealer and at the same time makes for simple and straightforward stock-keeping for the wholesaler and the dealer.

It is a further object of the invention to provide flexible storage for both single and double compact discs.

Furthermore, it is a desire not to have more stands in use than one has compact discs for, while the storage space can be expanded when required.

By means of the modular unit according to the present invention, a rack system is thus provided which can be assembled as a compact disc stand corresponding to the number of compact discs the user has. It is thus possible, moreover, to keep in a drawer extra racks which can be added onto the compact disc stand unit according to need. By varying the colors of the individual modular units, these can be assembled according to a filing system, while also providing a decorative appearance.

Instead of a compact disk or two compact discs, a drawer unit can instead be inserted in each of one or more respectives ones of the modular slot units. These drawers can be used to store small items such as screws, etc. A flexible system is thus provided which can be used for storing compact discs, and/or for other appropriate storage purposes.

BRIEF DESCRIPTION OF THE DRAWINGS

The invention shall be described in detail below with reference to the drawings, wherein.

DETAILED DESCRIPTION

Figure 1:
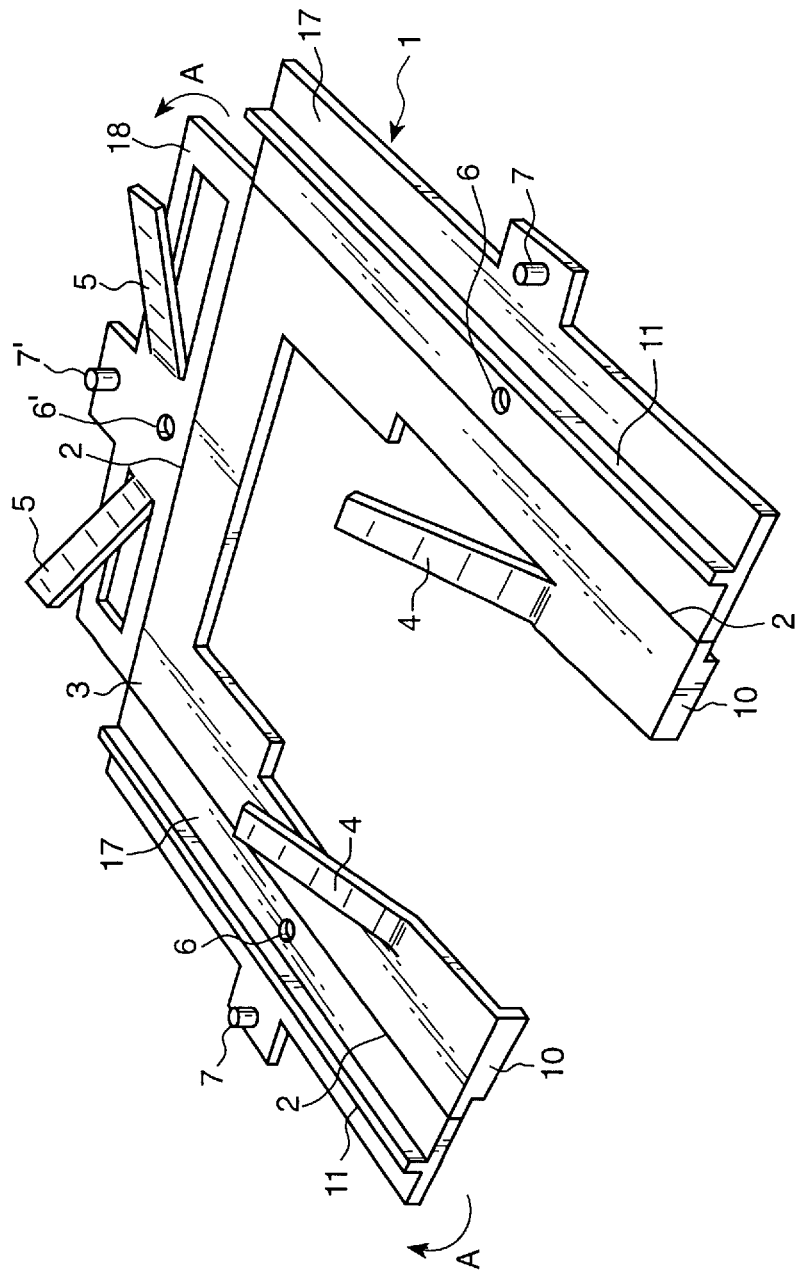
FIG. 1 illustrates a modular unit for a rack unit.
Figure 2:
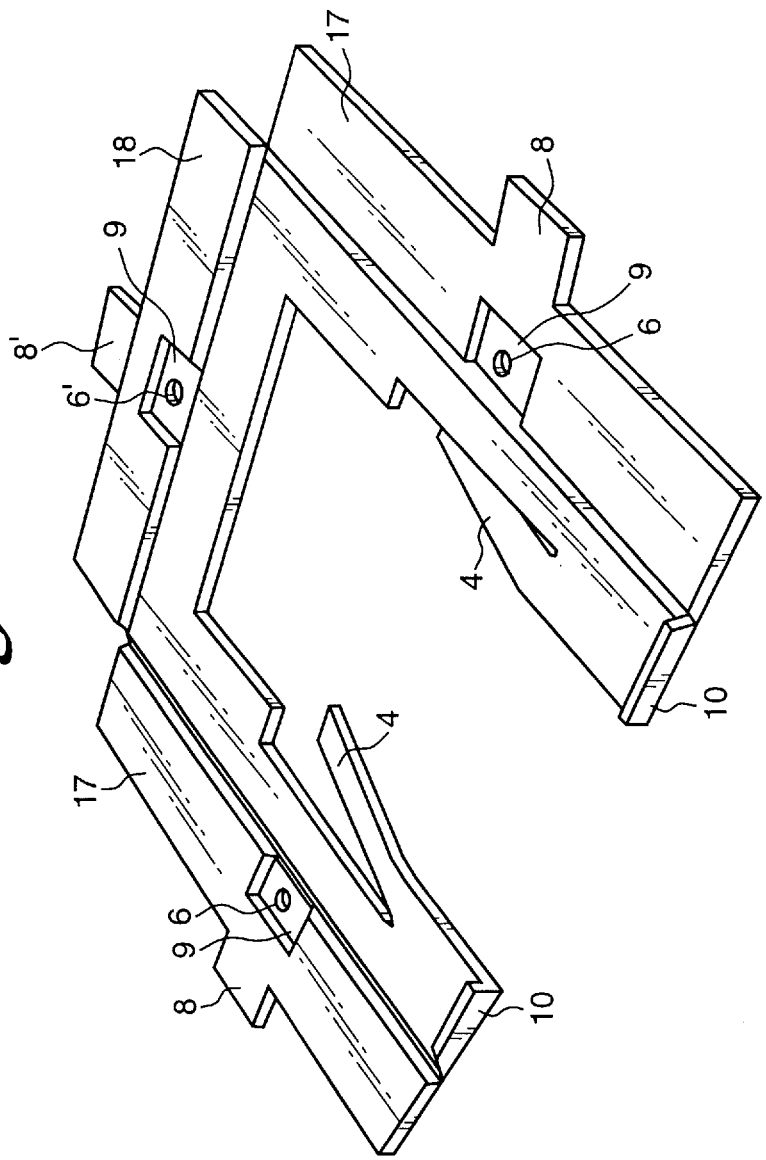
FIG. 2 shows a variant of the rack unit illustrated in FIG. 1 and shown from the opposite side from that shown in FIG. 1.
Figure 3:
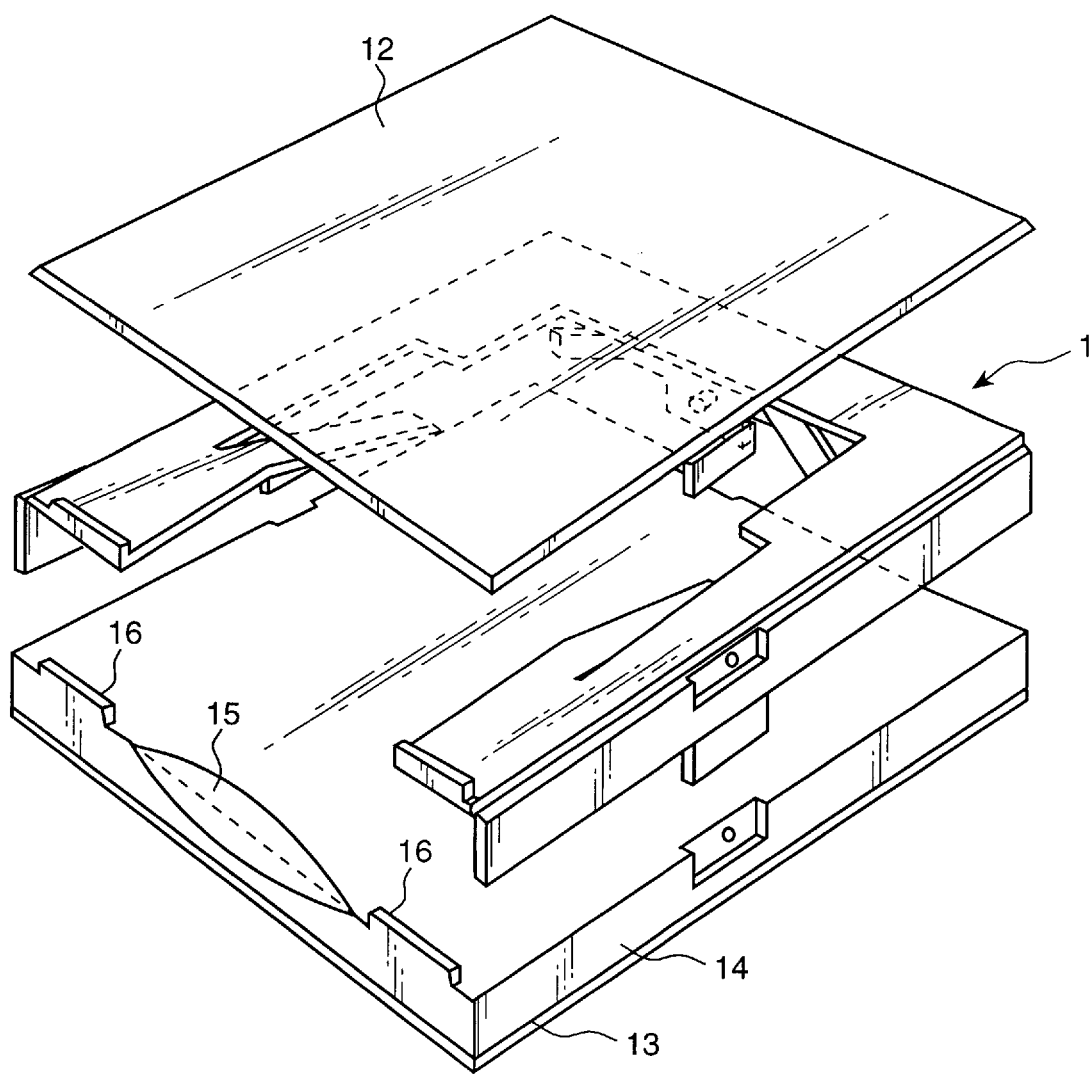
FIG. 3 is a schematic illustration of the assembly of a rack unit and rack, with the parts taken apart.

FIG. 1 illustrates a one piece blank which is foldable to provide a modular unit 1 for storing a single compact disc. The individual modular units are manufactured in one piece by, e.g., injection molding of a plastic material suitable for the purpose. Other methods of manufacture and other materials can be used instead. The modular units 1 when in blank form, each consist of a central portion 3, which in the unit illustrated in FIG. 1, forms the top surface of the upper side of the rack unit and the bottom for the underside of the next rack unit to be mounted thereon. Side members 17 and end members 18 of the rack unit are hinged to the rack unit bottom or rack unit top 3. The hinging is provided by means of, e.g., scored lines in the material, as indicated by means of folding lines 2 on FIG. 1. When assembling the rack unit, the members 17 and 18 are thus folded about the folding lines 2, as indicated by means of the arrows A in FIG. 1. FIG. 3 shows a rack unit 1 folded and ready for attachment to a base plate 14. The attachment means may be in the form of pins or lugs 7, 7' which interact with holes 6, 6', opening through pockets or recesses formed in outer surfaces of the side and end walls in the underlying base plate 14 or underlying rack unit. The pins or lugs are formed on projecting plane flaps or tabs. The attachment means 7, 7' may be of the same design as any previously known locking mechanism where there is interaction between pins and holes. Spacer strips 11 may be provided on the side members 17 so that when a compact disc or drawer is introduced into the rack section it is prevented from ramming against any attachment means 7, 7' which project from the hole 6 or 6'. In FIG. 1, these spacer strip 11 are shown integrally formed as a part of the blank which is foldable to provide a modular unit. In FIG. 2 a variant is shown where the spacer strips 11 have been omitted, but if necessary spacer strips can be formed separately and adhered to the blank from which the unit FIG. 2 is folded. Moreover, these spacer strips can be made in other suitable ways without this having any consequence for the main concept behind the invention.

The modular unit 1 is, moreover, provided with resilient members 4 projecting upwards from the central portion 3, which upon the insertion of a drawer or compact disc into the slot provided by the respective unit press the respective said compact disc or drawer down against the bottom of the respective underlying structure of the rack so that a fully inserted compact disc or drawer will remain locked behind the projections 10 on the central portion 3. When the compact disc or drawer is to be removed from the rack, it is gently pushed in and lifted up free from the projection 10, and thus becomes capable of being removed. To simplify removal, projecting springs 5 are provided in the end member 18, in the embodiment illustrated in FIG. 1. These resilient projections 5 will on insertion give a small amount of resistance which upon depressing the compact disc will press this against the projection 10 and retain it further. Upon pressing in and lifting the compact disc or drawer using a finger, the compact disc or drawer will spring out so that it may readily be gripped. To simplify access to the lowermost compact disc or rack unit of a rack there is provided in the base plate 14 which forms the bottom of the rack a recess 15 in the front thereof. The retaining projections in the base plate are shown in FIG. 3 at 16.

In FIG. 2, the end member 18 of the rack unit blank of the second embodiment is shown without having the springs which are shown provided at 5 in the first embodiment, in FIGS. 1 and 3. This is to show that it is also possible to make the module without springs of this kind, or optionally to affix a resilient spacer to the end member 18 after molding of a blank for a rack unit, actual manufacture where this resilient piece will be capable of functioning in the same way as the resilient projections 5.

In FIG. 3 a top plate is shown which can be placed on the uppermost modular unit to provide a uniform and aesthetic exterior. This top plate 12 is provided with a flat upwardly presented surface, and downwardly projecting tabs having pins which interact with the holes 6 in the underlying modular rack unit.

In the illustrated example, the top plate 12 is shown having only one downward projecting tab with attachment means on each side member and each end member, in that this is considered to be sufficient to provide a stable and robust structure. But there is of course nothing to prevent there being provided several attachment means of this kind on each side and possibly on the end member.

In the illustrated embodiment, the side and end members are made in a continuous piece, but it will also be possible to split the side members or the end members, where one or all the pieces are made having attachment means. In this way one member will be capable of being released from the side, without this having an negative effect on the stability, to be able to have access to possible marking or, for example, can be torn off along the scored line to gain access to the coupling holes in order to couple together several rack units in the lateral direction. The pins 7 will also be capable of being made to have a hollow interior so that these can accommodate locking pins which are coupled between adjacent racks.

The back wall could also be made with holes for screw attachment to the wall so that the rack units can be secured to a wall. The base plate can to advantage be equipped with a skid-proof mat 13.

I claim:

1. A rack unit for an article storage rack, comprising: a first generally rectangular modular blank having a generally horizontal central element hinged by respective hinges along two laterally opposite edges thereof to two respective side elements and hinged by a hinge along a rear edge thereof to a respective end element to form a first module;

each of said side and end elements being provided adjacent the respective hinge with at least one upwardly opening recess having a bottom surface out through which opens a respective upwardly opening hole;

each of said side and end elements being further provided, distally of each said recess, with a respective laterally projecting tab having a downwardly projecting pin based thereon;

said recesses, holes, tabs and pins being correspondingly sized and placed such that when said two side elements and end elements are folded down at respective right angles to said central element to form a first module while juxtaposed in vertical registration with a closely underlying similar second rack unit modular blank having side and end elements which have been correspondingly folded down to form an under lying second module, corresponding tabs of said first module are received in corresponding recesses of the underlying second module, corresponding pins of the first module are received in corresponding holes of the underlying second module, and a forwardly opening slot for receiving an article is formed between said side elements and said end element and under said central element of said first module and delimited below by the underlying second module.

2. The rack unit modular blank of claim 1, further comprising at least one downwardly projecting spring based on said end element and arranged to project forwardly into said slot when said side and end elements are folded down to form said first module.

3. The rack unit modular blank of claim 2, wherein: each spring is made as one piece with the respective end element.

4. The rack unit modular blank of claim 2, further comprising:

two laterally spaced downwardly projecting springs based on said central element and arranged to project downwardly into said slot when said side and end elements are folded down to form said first module.

5. The rack unit modular blank of claim 1, further comprising:

a spacer strip extending in a front to rear direction on a lower surface of each said side element of said blank and arranged to project medially into said slot when said side and end elements are folded down to form said first module.

* * * * *